US012785167B2

(12) United States Patent
Park et al.

(10) Patent No.: US 12,785,167 B2
(45) Date of Patent: Nov. 3, 2026

(54) SECONDARY BATTERY AND SECONDARY BATTERY MODULE INCLUDING THE SAME

(71) Applicant: LG Energy Solution, Ltd., Seoul (KR)

(72) Inventors: Su Han Park, Daejeon (KR); Young Hwan Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 718 days.

(21) Appl. No.: 18/031,234

(22) PCT Filed: Aug. 24, 2022

(86) PCT No.: PCT/KR2022/095119
§ 371 (c)(1),
(2) Date: Apr. 11, 2023

(87) PCT Pub. No.: WO2023/027566
PCT Pub. Date: Mar. 2, 2023

(65) Prior Publication Data
US 2023/0378566 A1 Nov. 23, 2023

(30) Foreign Application Priority Data
Aug. 25, 2021 (KR) ........................ 10-2021-0112116

(51) Int. Cl.
*H01M 10/654* (2014.01)
*A62C 3/16* (2006.01)
(Continued)

(52) U.S. Cl.
CPC ............. *H01M 10/654* (2015.04); *A62C 3/16* (2013.01); *H01M 10/658* (2015.04);
(Continued)

(58) Field of Classification Search
CPC ............. H01M 10/654; H01M 10/658; H01M 50/105; H01M 50/186; H01M 50/46;
(Continued)

(56) References Cited

U.S. PATENT DOCUMENTS 10,874,889 B2 12/2020 Ryu et al.
2010/0330427 A1* 12/2010 Kogetsu ................ H01M 4/661 219/137 R
(Continued)

FOREIGN PATENT DOCUMENTS

CN 206098520 U 4/2017
CN 111740141 A 10/2020
(Continued)

OTHER PUBLICATIONS

Extended European Search Report including Written Opinion for Application No. 22861774.2 dated Nov. 7, 2024, pp. 1-8.
(Continued)

*Primary Examiner* — Michael Y Sun
(74) *Attorney, Agent, or Firm* — Lerner David LLP

(57) ABSTRACT

A secondary battery includes a separator in an electrode assembly thereof that has a sealing part for individually sealing a positive electrode and a negative electrode and has a double sealing structure. The double sealing structure including a first sealing part and a second sealing part so that an accommodation part for accommodating a fire extinguishing agent is provided at an end part of the negative electrode. Further, the secondary battery includes a flame propagation prevention part disposed on an outer surface of the electrode assembly so that a flame generated during thermal runaway of the secondary battery can be blocked in a stage in which the electrode assembly is positioned inside the battery cell, and thus a longer flame propagation time can be induced.

14 Claims, 7 Drawing Sheets

(51) Int. Cl.

| | |
|---|---|
| ***H01M 10/658*** | (2014.01) |
| ***H01M 50/105*** | (2021.01) |
| ***H01M 50/186*** | (2021.01) |
| ***H01M 50/46*** | (2021.01) |
| ***H01M 50/463*** | (2021.01) |
| ***H01M 50/489*** | (2021.01) |

(52) U.S. Cl.
CPC ....... *H01M 50/105* (2021.01); *H01M 50/186* (2021.01); *H01M 50/46* (2021.01); *H01M 50/463* (2021.01); *H01M 50/489* (2021.01)

(58) Field of Classification Search
CPC ............. H01M 50/463; H01M 50/489; H01M 10/0585; H01M 10/4235; H01M 50/184; H01M 2200/10; H01M 10/0463; H01M 50/383; H01M 50/466; A62C 3/16; A62C 99/0018; A62D 1/0092; A62D 1/06; C09K 21/02; Y02E 60/10; Y02P 70/50
See application file for complete search history.

(56) References Cited

U.S. PATENT DOCUMENTS

| | | | | |
|---|---|---|---|---|
| 2014/0017525 | A1* | 1/2014 | Schaefer | H01M 10/658 429/61 |
| 2014/0087222 | A1 | 3/2014 | Yamane et al. | |
| 2014/0205886 | A1 | 7/2014 | Sakaguchi | |
| 2018/0190952 | A1 | 7/2018 | Kim et al. | |
| 2020/0099114 | A1 | 3/2020 | Ryu et al. | |
| 2022/0069377 | A1* | 3/2022 | Rhee | H01M 10/647 |
| 2022/0393265 | A1* | 12/2022 | Akiyama | H01G 11/82 |

FOREIGN PATENT DOCUMENTS

| | | | | | |
|---|---|---|---|---|---|
| JP | 2009224309 | A | | 10/2009 | |
| JP | 2010199281 | A | * | 9/2010 | H02S 20/25 |
| JP | 2014075305 | A | | 4/2014 | |
| JP | 2014082193 | A | | 5/2014 | |
| JP | 2014139885 | A | | 7/2014 | |
| JP | 2014158508 | A | | 9/2014 | |
| JP | 2018174079 | A | | 11/2018 | |
| JP | 2019033123 | A | | 2/2019 | |
| JP | 2019102139 | A | | 6/2019 | |
| JP | 2019153790 | A | | 9/2019 | |
| KR | 20170053110 | A | | 5/2017 | |
| KR | 101807354 | B1 | | 12/2017 | |
| KR | 20180081926 | A | | 7/2018 | |
| KR | 20190094921 | A | | 8/2019 | |

OTHER PUBLICATIONS

International Search Report for PCT/KR2022/095119 mailed Dec. 12, 2022. 3 pgs.

* cited by examiner

[Fig.1]
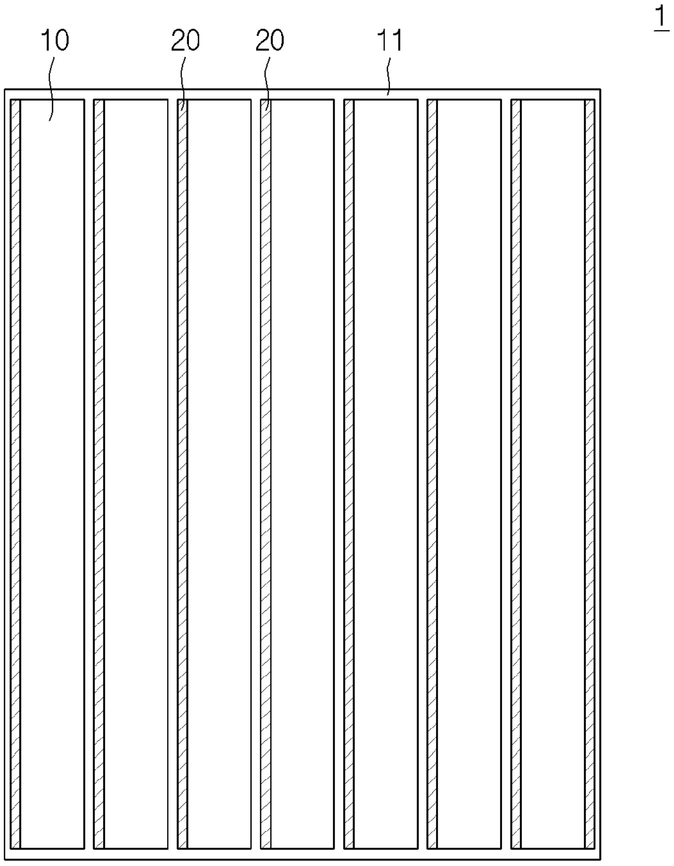
Prior Art

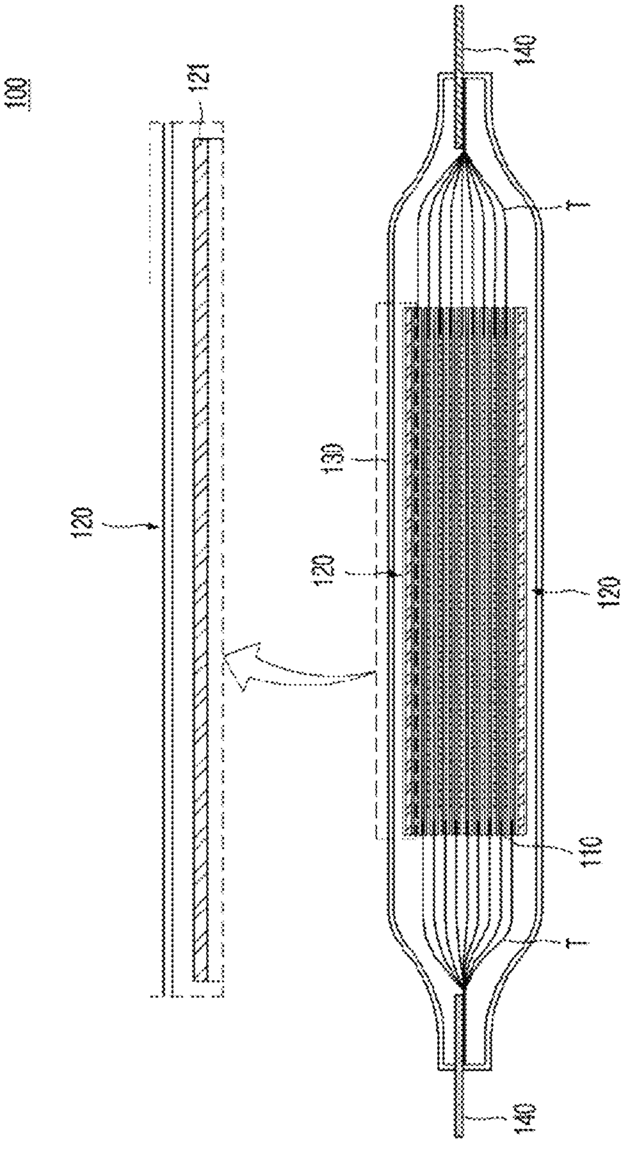
[Fig.2]

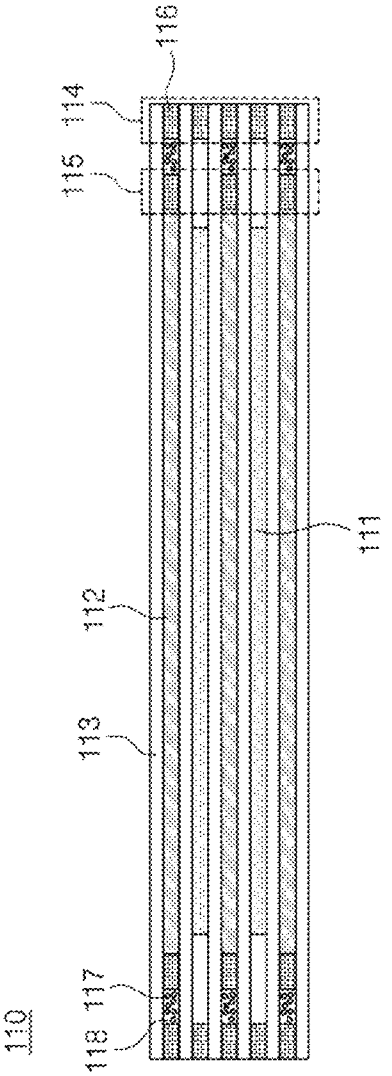
[Fig.3]

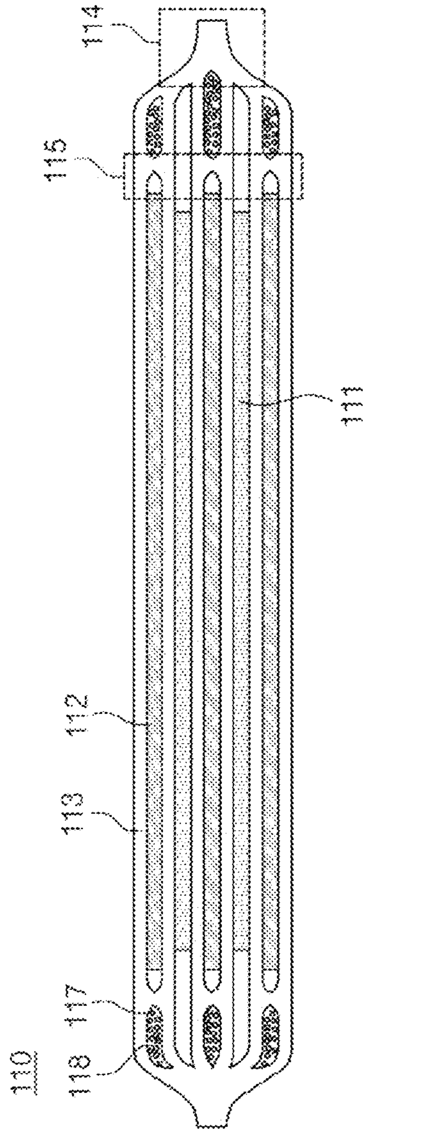
[Fig.4]

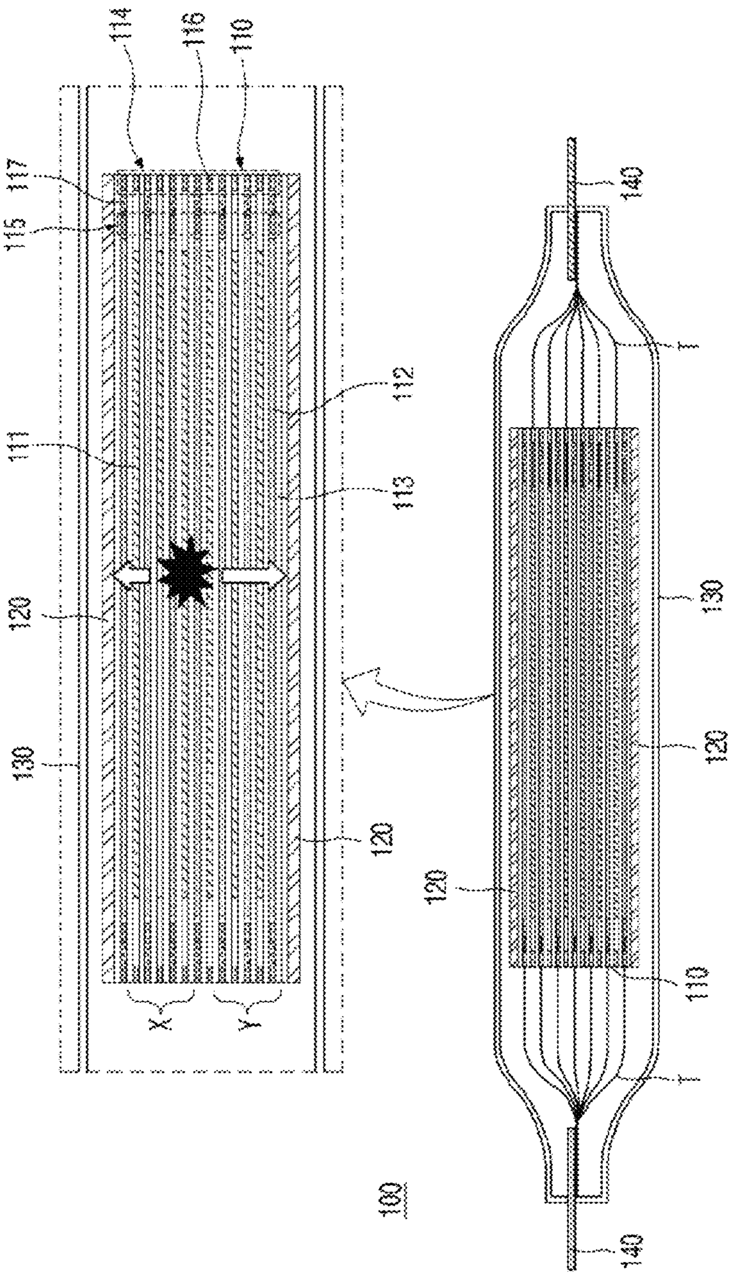
[Fig. 5]

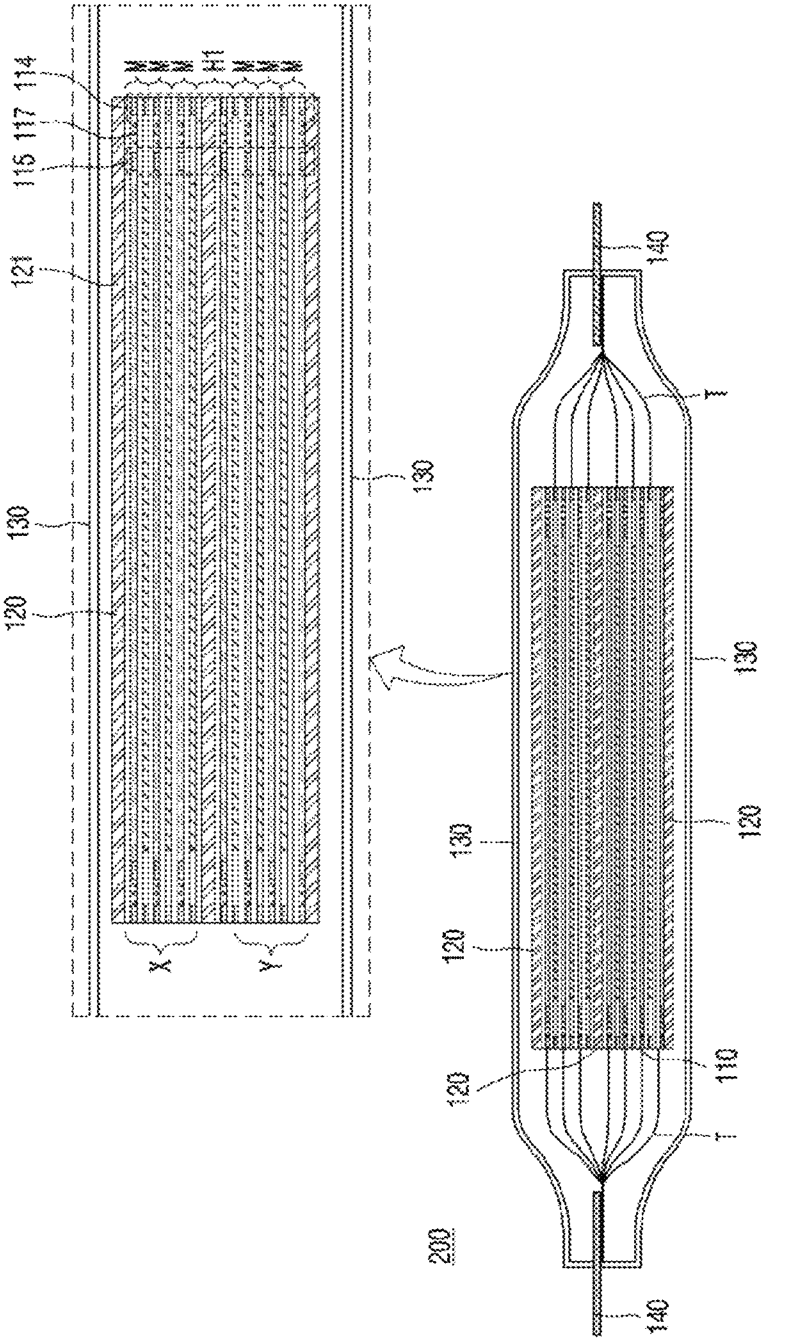
[Fig.6]

[Fig.7]
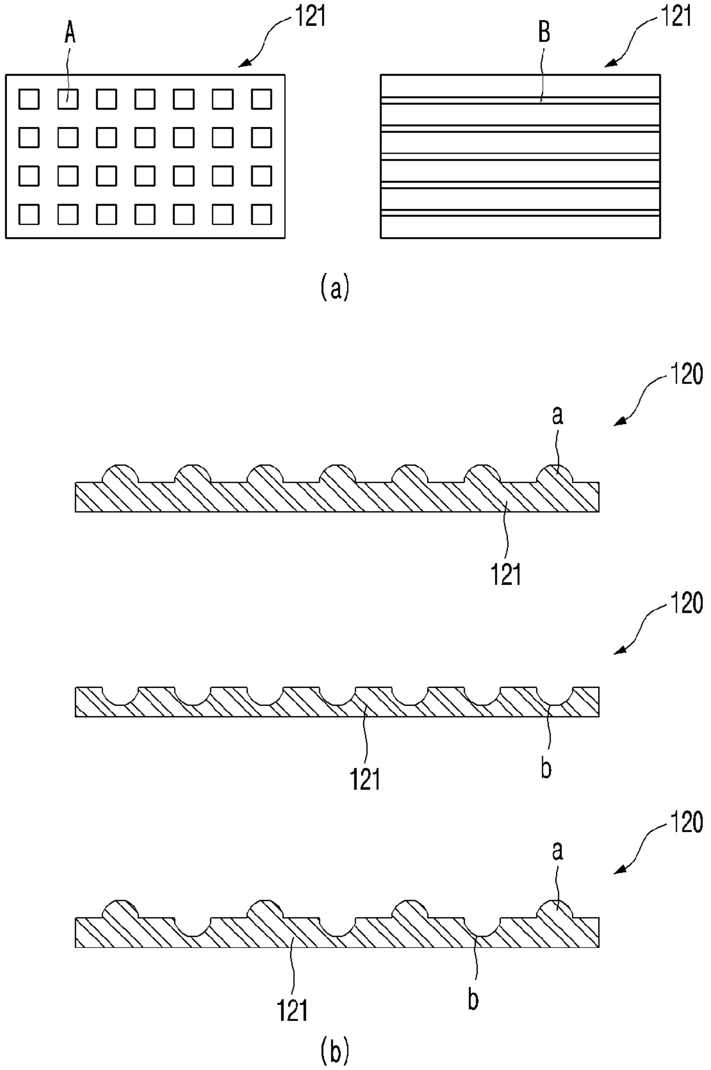

SECONDARY BATTERY AND SECONDARY BATTERY MODULE INCLUDING THE SAME

CROSS-REFERENCE TO RELATED APPLICATIONS

The present application is a national phase entry under 35 U.S.C. § 371 of International Application No. PCT/KR2022/095119 filed on Aug. 24, 2022 which claims priority from Korean Patent Application No. 10-2021-0112116, filed on Aug. 25, 2021, all of which are incorporated herein by reference.

TECHNICAL FIELD

The present disclosure relates to a secondary battery and a secondary battery module including the same.

BACKGROUND ART

As development and demand for technology for mobile devices increase, the demand for secondary batteries is also rapidly increasing. Among secondary batteries, lithium secondary batteries have high energy density, an operating voltage, and excellent storage and lifetime characteristics, and thus have been widely used as energy sources not only for mobile devices but also for various other electronic products.

Examples of such secondary batteries include lithium-ion batteries, lithium polymer batteries, nickel cadmium batteries, nickel hydrogen batteries, nickel zinc batteries, and the like. In addition, lithium secondary batteries may be divided into angular batteries, pouch-type batteries, and cylindrical batteries according to a shape thereof.

Recently, secondary batteries have been widely used not only in small devices such as portable electronic devices, but also in medium-to-large devices such as battery packs or power storage devices of hybrid or electric vehicles.

Although such secondary batteries have advantages such as a high operating voltage, high energy density, and the like, the secondary batteries use an organic electrolyte, and thus when the lithium secondary batteries are overcharged, the overcharging may cause overcurrent and overheating, and in severe cases, a fire can occur due to explosion or ignition.

Further, in the case of a battery module in which a plurality of battery cells are stacked, when any one battery cell explodes or ignites, the flame is propagated to other normally operating battery cells, which may cause the plurality of battery cells to explode in a chain, and thus damage may occur to a device in which the battery module is installed and a user can be exposed to a risk of an accident.

FIG. 1 is a schematic diagram illustrating an example of a structure of a conventional battery module proposed for preventing flame propagation between battery cells.

A conventional battery module 1 includes a plurality of battery cells 10, flame propagation prevention members 20 positioned between the battery cells, and a module case 11.

Even when explosion or ignition occurs in any one of the plurality of battery cells 10, the flame may be prevented from propagating to the remaining battery cells because the flame propagation prevention member 20 is positioned between the battery cells.

However, in the conventional battery module described above, since the flame propagation prevention members are installed outside each battery cell, it is impossible to prevent an electrode assembly inside the battery cell from burning. That is, when ignition occurs in the electrode assembly inside the battery cell, the flame propagation cannot be blocked in a stage in which the electrode assembly is positioned inside the battery cell, and thus the battery cells burn unimpeded until the electrode assembly and the battery case that surrounds the electrode assembly have fully burned. When the battery cells have completely burned, such as the battery case burning as well as the electrode assembly, the burning temperature becomes higher and a risk of explosion increases.

Since the conventional battery module has the flame propagation prevention member installed between the battery cells, it is possible to delay propagation of the flame to other battery cells for a certain time. However, a flame propagation time between battery cells is relatively short because the flame is not blocked from the stage in which the electrode assembly is positioned inside the battery cell. When a so-called thermal runaway phenomenon occurs in which battery cells ignite in a battery module in which a laminate of a plurality of battery cells is accommodated, the extent to which flame propagation time can be reduced is an important factor in the quality evaluation of the battery module. A short flame propagation time means that the risk of explosion of the entire battery module as well as the individual battery cells increases. Therefore, the structure of the conventional battery module has a limit in suppressing the flame propagation time.

Meanwhile, a plurality of positive electrodes and a plurality of negative electrodes are alternately stacked in an electrode assembly, and separators are interposed between the positive electrodes and the negative electrodes. In this case, the negative electrodes are formed to have a larger area than the positive electrodes, and the separators are manufactured to extend beyond the positive electrodes and/or the negative electrodes in order to prevent a short circuit between the positive electrodes and the negative electrodes. However, a high-capacity secondary battery may generate a considerable amount of heat during charging and discharging, and thus the separator may shrink due to the generated heat. The positive electrode may come into contact with the negative electrode due to the shrunk separator, and thus an internal short circuit occurs. The internal short circuit can cause explosion or ignition of the battery, and thus it is necessary to improve the internal short circuit problem of the electrode assembly in order to improve the safety of the secondary battery.

DISCLOSURE

Technical Problem

An object of the present disclosure is to provide a secondary battery in which, when the secondary battery is exposed to a high temperature, an internal short circuit and explosion and/or ignition of the secondary battery caused by the internal short circuit are suppressed by preventing the shrinkage of a separator included in an electrode assembly.

Additionally, an object of the present disclosure is to provide a secondary battery and a module including the same in which, when a battery cell explodes or ignites, a flame propagation generated from an internal of a battery cell is blocked or delayed by a flame propagation prevention sheet that positioned inside the battery cell.

Furthermore, an object of the present disclosure is to provide a secondary battery and a module including the same in which, particles are prevented from falling out of a flame propagation prevention sheet positioned inside the battery cell.

Technical Solution

The present disclosure is directed to solving the above-described problem by providing a secondary battery including an electrode assembly having a stacked structure including a positive electrode, a negative electrode, and a separator, and a battery case in which the electrode assembly is accommodated, wherein the separator included in the electrode assembly includes a first sealing part bonded to end parts of the separator at an outer side of the electrode assembly to individually seal the positive electrode and the negative electrode, and a second sealing part configured to form an accommodation part between an end part of the negative electrode and the first sealing part by bonding the separator disposed on upper and lower surfaces of the negative electrode. In this case, the accommodation part may accommodate a fire extinguishing agent of which a phase is shifted to a gas phase at 100° C. to 300° C., and the fire extinguishing agent may include one or more of halogenated carbon, a halogenated ketone, a halogenated alkane, and an inert gas.

The first sealing part and the second sealing part may be formed to be bonded to each other by adhesion or thermal fusing.

An average thickness of the separators may range from 5 μm to 50 μm.

The secondary battery may include a flame propagation prevention part for delaying a flame propagation time.

The secondary battery may include a flame propagation prevention part disposed on at least one outer surface of the electrode assembly other than a surface on which a tab is formed.

The secondary battery may be configured by stacking a plurality of unit cells in the electrode assembly, and may include a flame propagation prevention part inserted between the stacked unit cells.

The flame propagation prevention sheet may be a silicate sheet made of a silicate containing one or more elements of silicon (Si), aluminum (Al), iron (Fe), magnesium (Mg), manganese (Mn), titanium (Ti), sodium (Na), potassium (K), fluorine (F), and oxygen (O).

Specifically, the flame propagation prevention sheet may include one or more of muscovite, fenzite, celonite, paragonite, margarite, phlogopite, biotite, anite, ferrous mica, siderophilite, clintonite, lithium muscovite, trillithionite, polylithionite, zinnwaldite, and taniolite.

The silicate sheet may contain a binder in an amount of 1 to 20 parts by weight with respect to 100 parts by weight of a total amount of the silicate, and the binder may include one or more of polyethylene (PE), polypropylene (PP), or a polyolefin including a copolymer of PE and PP, a polyamide including nylon, and heat-resistant silicone.

The flame propagation prevention sheet may have a protrusion, a concave part, or a predetermined pattern of repeating protrusions and concave parts on a surface thereof.

The present disclosure is also directed to providing a secondary battery module including the secondary battery as described above, and a module case in which the secondary battery is accommodated.

Advantageous Effects

According to a secondary battery according to the present disclosure, a separator included in an electrode assembly has a sealing part for individually sealing a positive electrode and a negative electrode and has a double sealing structure including a first sealing part and a second sealing part so that an accommodation part for accommodating a fire extinguishing agent is provided at an end part of the negative electrode. Therefore, it is possible to more effectively suppress the shrinkage of the separator when it is exposed to a high temperature, it is possible to immediately extinguish a spark generated inside the battery with a fire extinguishing agent, and thus it is possible to prevent an internal short circuit due to the shrinkage of the separator and explosion or ignition of the secondary battery due to the internal short circuit.

Further, the secondary battery includes a flame propagation prevention part disposed on an outer surface of the electrode assembly so that a flame generated during thermal runaway of the secondary battery can be blocked in a stage in which the electrode assembly is positioned inside the battery cell, and thus a longer flame propagation time can be induced. Therefore, the safety of a secondary battery and a secondary battery module including the same can be further improved.

BRIEF DESCRIPTION OF THE DRAWINGS

FIG. 1 is a schematic diagram illustrating an example of a structure of a conventional battery module proposed for preventing flame propagation between battery cells.

FIG. 2 is a cross-sectional view illustrating a structure of a secondary battery according to an embodiment of the present invention.

FIGS. 3 and 4 are cross-sectional views illustrating structures of an electrode assembly according to an embodiment of the present invention.

FIG. 5 is a schematic diagram illustrating a state of flame propagation of an electrode assembly having a stacked structure.

FIG. 6 is a cross-sectional view illustrating a structure of a secondary battery according to an embodiment of the present invention.

FIG. 7 illustrates schematic diagrams illustrating a pattern of a flame propagation prevention sheet of an embodiment of the present invention.

DETAILED DESCRIPTION OF THE PREFERRED EMBODIMENTS

While the present invention may have various modifications and alternative forms, specific embodiments thereof will be described in detail.

However, it should be understood that there is no intent to limit the present invention to the particular forms disclosed, and on the contrary, the present invention is to cover all modifications, equivalents, and alternatives falling within the spirit and scope of the present invention.

It should be further understood that the terms "comprise," "comprising," "include," and/or "including," when used herein, specify the presence of stated features, integers, steps, operations, components, parts, or combinations thereof, but do not preclude the presence or addition of one or more other features, integers, steps, operations, components, parts, or combinations thereof.

In addition, when a layer, film, region, or plate is referred to as being "formed on" another layer, film, region, or plate, it includes a case in which the layer, film, region, or plate is formed directly on another layer, film, region, or plate and a case in which still another layer, film, region, or plate is interposed between the layer, film, region, or plate and another layer, film, region, or plate. In contrast, when a layer, film, region, or plate is referred to as being "formed below" another layer, film, region, or plate, it includes a case in which the layer, film, region, or plate is formed directly below another layer, film, region, or plate and a case in which still another layer, film, region, or plate is interposed between the layer, film, region, or plate and another layer, film, region, or plate. Further, in this specification, when a component is referred to as being disposed "on" another component, it includes a case in which a component is disposed above another component and a case in which a component is disposed below another component.

When the term "coupled" or "connected" is used in the present disclosure, it includes not only a case in which one member is directly coupled or connected to another member, but also a case in which one member is indirectly coupled or connected to another member through a connecting member.

Hereinafter, embodiments of the present invention will be described in more detail.

Secondary Battery

In an embodiment, the present disclosure provides a secondary battery including an electrode assembly including a plurality of positive electrodes and a plurality of negative electrodes which are alternately disposed and a plurality of separators which are individually interposed between the positive electrodes and the negative electrodes, a flame propagation prevention part installed on at least one outer surface of the electrode assembly, and a battery case in which the electrode assembly and the flame propagation prevention part are accommodated, wherein each of the positive electrode and the negative electrode includes a sealing part bonded to an outer side of each of the separator disposed on an upper surface thereof and the separator disposed on a lower surface thereof so as to individually seal the positive electrode and the negative electrode.

FIG. 2 is a cross-sectional view illustrating a structure of a secondary battery 100 according to an embodiment of the present invention.

Referring to FIG. 2, the secondary battery 100 according to an embodiment of the present invention has a structure in which an electrode assembly 110 is accommodated in a pouch-type battery case 130 and an electrolyte is injected into the battery case 130 so that the electrode assembly 110 is impregnated with the electrolyte.

The electrode assembly 110 may have various structures, and positive electrodes, separators, and negative electrodes may be stacked in the electrode assembly 110 in various ways. It is possible to apply the present invention to a mono-cell type secondary battery in which one full cell (mono cell) of positive electrode-separator-negative electrode is accommodated in a battery case. Further, the electrode assembly 110 may have a stacked structure in which a plurality of unit cells, such as mono cells which are arranged in the order of positive electrode-separator-negative electrode, bi-cells which are arranged in the order of positive electrode-separator-negative electrode-separator-positive electrode, or bi-cells which are arranged in the order of negative electrode-separator-positive electrode-separator-negative electrode, are stacked according to the capacity of the battery. A plurality of electrode tabs T protrude from the electrodes of the electrode assembly 110 and the plurality of electrode tabs T are connected to electrode leads 140. The electrode leads 140 are a type of terminal which is exposed to the outside and connected to an external device, and a conductive material may be used for the electrode leads 140. The electrode leads 140 may include a positive electrode lead and a negative electrode lead. The positive electrode lead and the negative electrode lead may be disposed in directions opposite to each other (a so-called bidirectional cell) with respect to a longitudinal direction of the secondary battery 100, or may be disposed in the same direction (a so-called unidirectional cell). FIG. 2 illustrates a bidirectional secondary battery 100.

An electrode assembly 110 of an embodiment of the present invention may be an electrode assembly 110 having a stacked structure as illustrated in FIG. 2. Alternatively, although not illustrated, the electrode assembly 110 may be an electrode assembly having a jelly-roll type structure in which long sheet-type positive and negative electrodes are wound with separators interposed therebetween, or an electrode assembly having a stack-folding type structure in which full-cells or bi-cells are wound using a continuous separator sheet having a long length as a mixed type of a jelly-roll type and a stack type.

Further, the electrode assembly 110 may have a structure in which a separator 113 positioned between a positive electrode 111 and a negative electrode 112 is bonded to an adjacent separator at an outer side thereof, and accordingly, the positive electrode 111 and the negative electrode 112 between the separators may be surrounded by the separator 113 and sealed, and sealing parts 114 and/or 115 may be provided at end parts of the bonded separators.

Specifically, in the electrode assembly 110, a plurality of positive electrodes 111 and a plurality of negative electrodes 112 are alternately disposed, and the separators 113 are individually inserted between the disposed positive electrodes 111 and the disposed negative electrodes 112 and are disposed on an outermost positive electrode and an outermost negative electrode. The separators 113 inserted in this way each include a first sealing part 114 that individually seals the positive electrode 111 and the negative electrode 112 by bonding the end parts thereof at the outer side of the electrode assembly 110, and include a second sealing part 115 positioned between an end part of the negative electrode 112 and the first sealing part 114 by bonding the separators 113 disposed on upper and lower surfaces of the negative electrode 112.

Accordingly, the first sealing part 114 is positioned at an end part of the positive electrode 111 sealed by the separator 113, and the first sealing part 114 and the second sealing part 115 are positioned at the end part of the negative electrode 112.

Here, the sealing parts 114 and 115 may be formed on outer surfaces of the electrode assembly 110 other than a side surface at the side on which the tab T is formed. Since a side surface of the electrode assembly 110 positioned at the side on which the tab T is formed is a path through which an electrolyte and gas flow, if the side surface is sealed, a basic function of electricity can be degraded.

Further, the sealing part 114 and/or 115 may have a constant area ratio with respect to a total area of the positive electrode 111 and/or the negative electrode 112 in order to suppress the shrinkage of the separator 113 at a high temperature. Specifically, the first sealing part 114 and/or the second sealing part 115 may have an area ratio of 2% or more with respect to the total area of the positive electrode 111 and/or the negative electrode 112, and more specifically, may have an area ratio of 4% or more, 5% or more, 8% or more, 10% or more, 15% or more, or 20% or more, or may have an area ratio from 5 to 20%, from 5 to 15%, from 5 to 10%, from 10 to 20%, from 11 to 19%, or from 8 to 14%.

As an example, the first sealing part 114 may have an area ratio of 3% with respect to the total area of the negative electrode 112, and the second sealing part 115 may have an area ratio from 5 to 8% with respect to the total area of the negative electrode 112.

According to an embodiment of the present invention, by allowing the area of the sealing part 114 and/or 115 to satisfy the above area ratio with respect to the total area of the sealed positive electrode 111 and/or negative electrode 112, the separator 113 may be firmly fixed around the electrode when exposed to a high temperature while maintaining a high energy density, and thus the shrinkage of the separator 113 can be minimized That is, it is possible to prevent an effect of suppressing the shrinkage of the separator from being realized due to the significantly low area ratio of the sealing part, or to prevent a decrease in energy density of the electrode assembly due to the excessively high area ratio of the sealing part.

Further, the separator 113 may have an area large enough to cover surfaces of the positive electrode 111 and the negative electrode 112 and to leave a surplus part of the separator 113 around each electrode. In this case, by implementing bonding of the separators along the surplus part of the separator 113, the sealing parts 114 and 115 that can fix the separator 113 while sealing the respective electrodes around the positive electrode 111 and the negative electrode 112 may be formed. That is, the sealing parts 114 and 115 may serve to fix the end part of the separator 113 when the secondary battery 100 is exposed to a high temperature, and accordingly, the shrinkage of the separator 113 may be suppressed. In particular, the secondary battery 100 according to an embodiment of the present invention includes the second sealing part 115 for additionally double sealing the negative electrode 112 to an inside of the first sealing part 114, and thus the shrinkage resistance of the separator 113 at a high temperature may be further improved as compared to the case of including only the first sealing part 114 for individually sealing the positive electrode 111 and the negative electrode 112.

In addition, the separator 113 may form the first sealing part 114 and the second sealing part 115 using an adhesive means applied in the art or by applying heat and fusing when bonding the separators.

As an example, as illustrated in FIG. 3, the separator 113 may form the sealing part 114 and/or 115 using a means such as an adhesive or the like containing polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene ether polymer (EPDM), sulfonated EPDM, styrene butadiene rubber (SBR), fluororubber, an acrylic copolymer, or the like.

As another example, as illustrated in FIG. 4, the separator 113 may form the sealing part 114 and/or 115 by pressurizing and thermally fusing the outer side of the separator 113 under a high temperature condition.

In addition, an average thickness of the separators 113 may range from 5 μm to 50 μm, and specifically, may range from 10 μm to 40 μm, 20 μm to 30 μm, or 17 μm to 28 μm. In an embodiment of the present invention, by controlling the average thickness of the separators 113 within the above range, a total thickness of the electrode assembly 110 can be prevented from becoming excessively thick, and thus the energy density can be further increased.

Furthermore, the electrode assembly 110 has a configuration including an accommodation part 118 between the first sealing part 114 and the second sealing part 115. The accommodation part 118 is formed by bonding the separators 113 disposed on the upper and lower surfaces of the negative electrode 112, and accordingly, may include a certain space in the form of a pouch at the end part of the negative electrode 112. In this case, a size of the accommodation part 118 is not particularly limited, but when the sealing part is formed by an adhesive means, the thickness of the sealing part may be the same as an average thickness of the negative electrodes.

Further, the accommodation part 118 may include a fire extinguishing agent that can reduce and/or remove a spark generated inside a secondary battery cell by acting on the spark.

Here, a type of fire extinguishing agent used for conventional fire suppression may be used as the fire extinguishing agent regardless of whether it is a powder, liquid, or gas, and various types of fire extinguishing agents applied in the art may be used. As the principle of fire extinguishing, asphyxiation fire extinguishing, cooling fire extinguishing, or fire extinguishing using both of these principles are also applicable.

Specifically, as the fire extinguishing agent, a material in which a main component is a component that is not limited in production and use by the Montreal Protocol and has excellent extinguishing performance may be used, and the material is liquid at room temperature and may be phase-shifted into a gas phase at a specific temperature, for example, 100 to 300° C., and specifically, at a temperature of 100 to 200° C.

Examples of the fire extinguishing agent may include halogenated carbon such as fluorine carbon, fluorine chlorine carbon, fluorine bromine carbon, fluorine iodine carbon, iodofluoro carbon (FIC-217I1 or FIC-13I1), etc., halogenated alkanes such as 2-iodine-1,1,1,2,3,3,3-heptafluoropropane (HFC-227ea), 1,1,1,2,2-pentafluoroethane ($CF_3CF_3H$, HFC-125), 1,1,1,2,3,3,3-heptafluoropropane ($CF_3CHFCF_3$), chlorotetrafluoroethane ($CHClFCF_3$), 1-chloro-1,2,2,2-tetrafluoroethane (C2HClF4), 2-chloro-1,1,1,2-tetrafluoroethane ($CHClFCF_3$, HCFC-124), etc., halogenated ketones such as dodecafluoro-2-methylpentan-3-one (FK-5-1-12, $CF_3CF_2C(O)CF(CF_3)_2$)), decafluorocyclohexanone (perfluorocyclohexanone), $CF_3CF_2C(O)CF(CF_3)_2$(-1,1,1,2,4,4,5,5,5-nonafluoro-2-trifluoromethyl-butan-3-one), $(CF_3)_2CFC(O)CF(CF_3)_2$(-1,1,1,2,4,5,5,5,6,6,6-octafluoro-2,4-bis (trifluoro methyl)pentan-3-one), $CF_3CF_2C(O)CF_2CF_2CF_3$, $CF_3C(O)CF(CF_3)_2$, 1,1,1,3,3,4,4,5,5,6,6,7,7,8,8,8-hexadodecafluorooctan-2-one ($CF_3CF_2CF_2CF_2CF_2CF_2C(O)CF_3$), 1,1,1,3,4,4,4-heptafluoro-3-trifluoromethylbutan-2-one ($CF_3C(O)CF(CF_3)_2$), 1,1,1,2,4,4,5,5-octafluoro-2-trifluoromethylpentan-3-one ($HCF_2CF_2C(O)CF(CF_3)_2$), 1,1,1,2,4,4,5,5,6,6,6-undecafluoro-2-trifluoromethylhexan-3-one ($CF_3CF_2CF_2C(O)CF(CF_3)_2$), 1-chloro-,1,1,3,4,4,4-hexafluoro-3-trifluoromethyl-butan-2-one ($(CF_3)_2CFC(O)CF_2CL$), 1,1,1,2,2,4,4,5,5,6,6,6-dodecafluorohexan-3-one ($CF_3CF_2C(O)CF_2CF_2CF_3$), 1,1,1,5,5,5-hexafluoropentane-2-4-dione ($CF_3C(O)CH_2C(O)CF_3$), 1,1,1,2,5,6,6,6-octafluoro-2,5-bis(trifluoromethyl)hexane-3,4-dione ($(CF_3)_2CFC(O)C(O)$ $C(O)CF(CF_3)_2$), 1,1,1,2,2,3,3,5,5,6,6,7,7,7-tetradecafluoroheptan-4-one ($CF_3CF_2CF_2C(O)CF_2CF_2CF_3$), 1,1,1,3,3,4,4,4-octafluorobutal-2-one ($CF_3C(O)CF_2CF_3$), 1,1,2,2,4,5,5,5-octafluoro-1-trifluoromethoxy-4-trifluoromethylpentan-3-one ($CF_3OCF_2CF_2C(O)CF(CF_3)_2$), 1,1,1,2,4,4,5,5,6,6,7,7,7-tridecafluoro-2-trifluoromethylheptan-3-one ($CF_3CF_2CF_2CF_2C(O)CF(CF_3)_2$), 1,1,1,2,2,3,4,5,5,5-decafluoro-3-methoxy-4-(trifluoromethyl)pentane, etc., and an inert gas such as nitrogen gas ($N_2$), argon gas (Ar), etc. alone or an inert gas formed by mixing nitrogen gas ($N_2$), argon gas (Ar), etc.

As an example, as the fire extinguishing agent, a fire extinguishing agent represented by Chemical Formula $C_pH_qO_rX_s$ (where, p, q, r, and s are integers from 0 to 20, and X is at least one of Br, I, and F) may be used, and for example, Novec 1230 of 3M Company may be used.

Further, the electrode assembly 110 includes a flame propagation prevention part 120 disposed on at least one outer surface thereof. In this specification, for example, in a battery module or battery pack in which a plurality of secondary batteries are inserted, the flame propagation prevention part 120 refers to, when one secondary battery ignites, a sheet-shaped member for preventing a flame caused by the ignition from being transmitted to other secondary battery cells. Further, since the flame propagation prevention part 120 is a sheet-shaped member, a sheet of the fabric concept is densely filled with, for example, crystalline silicate minerals such as mica without including holes like the conventional flame arrester, and thus the flame may be more effectively blocked.

In addition, the flame propagation prevention part 120 of an embodiment of the present invention may increase the rigidity of the secondary battery 100. For example, when the flame propagation prevention part 120 is installed in the electrode assembly, the flame propagation prevention part 120 serves to reduce the pressing width of the battery cell and protect and reinforce the electrode assembly 110 in the battery case 130 in an impact test of the secondary battery 100, as will be described below. Since the flame propagation prevention part 120 of the present embodiment is installed in the battery case 130, the flame propagation prevention part 120 has stronger rigidity even when a plurality of secondary batteries 100 are installed together, as well as when a single secondary battery 100 is employed as a power source of an electric device, and thus has independent technical meaning.

A flame propagation prevention sheet 121 performs a function of, for example, when a flame is generated in the secondary battery cell due to overcurrent or thermal runaway, preventing the flame from propagating to other parts in the secondary battery cell or to other adjacent secondary battery cells. Therefore, the flame propagation prevention sheet 121 may be made of one of materials that have both heat resistance and heat insulation to block a flame. Among the materials, the flame propagation prevention sheet 121 included in the flame propagation prevention part 120 of the present embodiment may be a silicate sheet having both heat resistance and heat insulation properties.

The silicate sheet referred to in the present embodiment is made of silicate and performs a function of realizing a flame retardant and/or flame resisting effect within the battery case. In this case, as the silicate, any silicate commonly used in the art may be applied without particular limitation, and specifically, a material containing one or more of silicon (Si), aluminum (Al), iron (Fe), magnesium (Mg), manganese (Mn), titanium (Ti), sodium (Na), potassium (K), fluorine (F), and oxygen (O) may be used.

In general, the silicate is a neutral salt in which hydrogen of silicic acid is substituted with another metal atom, and in the present embodiment, in order to realize a flame retardant and/or flame resisting effect, as the silicate, a material in which hydrogen is substituted with an element such as aluminum (Al), iron (Fe), magnesium (Mg), manganese (Mn), titanium (Ti), sodium (Na), potassium (K), etc. may be used, and in particular, layered silicate may be used for flame retardancy.

For example, examples of the silicate may include one or more of muscovite, fenzite, celonite, paragonite, margarite, phlogopite, biotite, anite, ferrous mica, siderophilite, clintonite, lithium muscovite, trillithionite, polylithionite, zinnwaldite, and taniolite.

As an example, the flame propagation prevention sheet 121 may include a mica sheet including mica.

Mica is a coarse material constituting granite, has excellent electrical insulation properties, and has very little change in physical properties when heated. Mica has excellent insulation resistance even at a high temperature of 500 to 1000° C. Further, mica has excellent flame retardancy, and has a characteristic that it does not generate smoke during burning or heating. Due to these characteristics, by installing the mica sheet including mica in the battery case of the secondary battery, it is possible to prevent or delay thermal runaway within the battery cells, and furthermore, prevent or delay the propagation of thermal runaway between the battery cells.

Further, in order to manufacture a silicate such as mica in the form of a sheet, the flame propagation prevention sheet 121 may be manufactured in a sheet shape suitable for the size of the electrode assembly by mixing scrap mica or pulverized mica, which is a main component, with a binder (e.g., heat-resistant silicone), forming a large plate, and then cutting the plate to have an appropriate length. However, the method of manufacturing the mica sheet is not limited thereto, and the mica sheet may be manufactured by various methods according to techniques commonly known in the art.

Here, the expression "consisting of as a main component" may mean that a target component is included in an amount of 60 parts by weight or more, 70 parts by weight or more, 80 parts by weight or more, 85 parts by weight or more, 90 parts by weight or more, 95 parts by weight or more, 98 parts by weight or more, or 99 parts by weight or more with respect to 100 parts by weight of a total amount of the material.

As an example, the flame propagation prevention sheet 121 may contain a binder in an amount of 1 to 20 parts by weight with respect to 100 parts by weight of a total amount of silicate.

Further, as the binder included in the sheet, a binder having excellent adhesion to silicate may be used. Specifically, examples of the binder may include one or more of polyethylene (PE), polypropylene (PP), or a polyolefin including a copolymer of PE and PP, a polyamide including nylon, and heat-resistant silicone, but the present invention is not limited thereto.

In addition, the flame propagation prevention part 120 may have a size to almost or completely cover the surface of the electrode assembly 110 in order to prevent flame propagation and protect the electrode assembly 110. Further, the flame propagation prevention sheet 121 may have an appropriate thickness in proportion to the thickness of the electrode assembly 110 used. For example, when the electrode assembly 110 having a stacked structure is used, a sheet having a thickness of about 0.1 to 1 mm may be used, but the present invention is not limited thereto. That is, a sheet having a thickness greater or smaller than that of the sheet may be used according to the electrode or battery standard.

The flame propagation prevention part 120 may be in contact with the electrode assembly to protect the electrode assembly 110 or may be stacked on the electrode assembly with another layer interposed therebetween. As illustrated in FIG. 2, the flame propagation prevention part 120 may be stacked on both the upper and lower surfaces of the electrode assembly 110 or may be stacked on any one of the upper and lower surfaces of the electrode assembly 110. In some cases, the flame propagation prevention part 120 may also be stacked on both side surfaces of the electrode assembly 110.

As illustrated in FIG. 2, as the battery case 130, a pouch-type battery case may be used, but the present invention is not limited thereto, and both a cylindrical can-type case and an angular can-type case may be used. The pouch-type battery case is made of an aluminum laminate film in which a resin and aluminum are stacked. When the battery (electrode assembly) ignites due to thermal runaway, the aluminum laminate film has a remarkably significantly deteriorated thermal barrier function and melts. Further, when the aluminum laminate film burns, toxic gas is generated and an additional material (battery case) in addition to the electrode assembly is also burned, and thus the burning temperature is also increased. Further, since a cylindrical can-shaped or angular can-shaped battery case is made of a metal can, the problem of heat propagation during thermal runaway is less serious than that of pouch-type battery cells, but from the viewpoint of safety, it is also necessary to prevent or delay heat propagation during thermal runaway. Ideally, the flame propagation prevention part 120 should completely block the propagation of heat or flame during thermal runaway, but it is important to delay the propagation as much as possible even when blocking is impossible. Since the secondary battery module is configured by stacking a plurality of secondary battery cells 100, the flame propagation may be delayed by more than a few minutes in the entire secondary battery module unit when the flame propagation is delayed even for several seconds to several tens of seconds in each secondary battery cell 100. The flame propagation delay characteristic is an important characteristic related to ignition, in particular, related to explosion prevention or maximum delay of explosion time.

FIG. 5 is a schematic diagram illustrating a state of flame propagation of an electrode assembly having a stacked structure.

As illustrated in FIG. 5, in the case in which stacked layers of an electrode assembly 110 are divided into, for example, an upper part (X part) and a lower part (Y part), when a flame occurs in a part of the X part, the flame progresses to upper and lower ends of the electrode assembly unimpeded within the electrode assembly 110. Therefore, as illustrated in FIG. 5, even when flame propagation prevention parts 120 are installed on upper and lower surfaces of the electrode assembly 110, the flame that has spread to the outside of the electrode assembly 110 can only be blocked, but the flame that has spread to the inside of the electrode assembly 110 cannot be prevented. In this case, the electrode assembly 110, which has been stacked in multiple stages for high capacity, is completely burned and consumed due to ignition of some of the unit cells. Further, when the high-stack electrode assembly is completely burned, the burning range may expand and the burning temperature may also increase, and thus it is difficult to suppress the flame propagation.

FIG. 6 is a schematic diagram illustrating a structure of a battery cell according to another embodiment of the present invention for solving the above problems.

Referring to FIG. 6, flame propagation prevention parts 120 are stacked between a unit cell (mono cell) M and a unit cell M positioned in the middle of the electrode assembly 110. The unit cell has a layer structure of positive electrode-separator 113-negative electrode-separator 113. That is, a predetermined number of unit cells are stacked on an X part, which is an upper part, centering on the flame propagation prevention parts 120, and a predetermined number of unit cells are stacked on a Y part, which is a lower part. For example, when a flame is generated in the X part due to overheating, the flame may propagate to an upper end of the X part. However, since the flame propagation prevention parts 120 are positioned between the unit cells of the X part and the Y part, the flame generated in the X part does not propagate to the Y part. Alternatively, even when the flame does propagate, the flame first propagates to the X part, and then the flame propagates to the Y part. In other words, the flame propagation prevention parts 120 serve as a type of barriers, block the flame propagation, and sequentially induce ignition during flame propagation. Accordingly, since the ignition proceeds sequentially even when the ignition proceeds in the Y part, it is possible to prevent the entire electrode assembly from being rapidly ignited and to delay the overall flame propagation time, thereby improving the safety of the battery cell.

The flame propagation prevention parts 120 may be positioned approximately in the middle part of the stacked unit cells, but the present invention is not limited thereto. As necessary, the flame propagation prevention parts 120 may be disposed between unit cells at a position close to the upper or lower part of the electrode assembly 110.

No matter where they are positioned, the flame propagation prevention parts 120 may suppress the flame propagation to the upper or lower side with respect to the sheet. Further, the number of flame propagation prevention parts to be installed is not limited to one. According to the number of stacked unit cells, two or more unit cells may be disposed at an appropriate position of the electrode assembly having a stack structure. However, when the flame propagation prevention parts are disposed, the upper unit cell, lower unit cell, or upper and lower unit cells with respect to the sheet part cannot perform the charging/discharging function of the battery. Therefore, it is preferable to arrange as few flame propagation prevention parts in the electrode assembly as possible. In other words, it is preferable to determine installation positions and the number of the flame propagation prevention parts within the most suitable range in consideration of battery capacity, safety, and the like.

Meanwhile, the electrode assembly 110 illustrated in FIG. 6 is disposed as a unit cell (mono cell) of which upper and lower parts have a symmetrical structure, and the part of the unit cell that does not contribute to charging and discharging may be minimized by arranging the flame propagation prevention part 120 on a part of a half cell H1 between the symmetrical structures.

The flame propagation prevention parts 120 of the present embodiment are not positioned only between the unit cells and may be stacked by replacing the separator 113 or the positive or negative electrode which is a part of another unit cell positioned between a specific unit cell M and the unit cell M. In other words, the flame propagation prevention parts may be installed at an appropriate location by comparing the battery capacity and safety. Referring to FIG. 6, the flame propagation prevention parts 120 are stacked instead of the separator 113 positioned on the negative electrode of the half cell H1.

Meanwhile, as illustrated in FIG. 6, when the flame propagation prevention parts 120 are installed on the upper or lower surface of the electrode assembly and inside the stacked electrode assembly 110, an effect of flame propagation prevention is maximized. However, when the flame propagation prevention parts 120 are installed, the number of unit cells that cannot participate in the battery reaction is increased, and thus the number of flame propagation prevention parts to be installed should be carefully determined in consideration of this.

FIG. 7 illustrates schematic diagrams illustrating a pattern of a flame propagation prevention sheet 121 of an embodiment of the present invention.

FIG. 7A illustrates a planar shape of the flame propagation prevention sheet 121, and FIG. 7B illustrates a shape of a side surface of the flame propagation prevention sheet 121.

Referring to FIG. 7, as the flame propagation prevention sheet 121, a flame propagation prevention sheet 121 with a predetermined pattern on a surface thereof may be used. That is, for example, when a mica sheet is used, mica has a property of splitting in a longitudinal direction, and thus protrusions, concave parts, or a pattern of repeating protrusions and concave parts may be formed on the surface to improve the strength of the mica sheet. In FIG. 7A, an example in which a quadrangular shape (A) is repeated or a stripe shape (B) is formed in a longitudinal direction of a sheet is illustrated as the shape of such a pattern, but the present invention is not limited thereto. Further, when the pattern is formed in the form in which protrusions (a), concave parts (b), or a pattern of repeating protrusions (a) and concave parts (b), as illustrated in FIG. 7B, a surface area of the flame propagation prevention sheet 121 may increase and thus a heat dissipation area may increase during thermal runaway. In FIG. 7, although the pattern is illustrated as being formed only on the upper surface of the flame propagation prevention sheet 121, the pattern may also be formed on each of the upper surface and the lower surface as necessary.

Since the secondary battery according to an embodiment of the present invention has the above-described configuration, it is possible to more effectively suppress the shrinkage of the separator when it is exposed to a high temperature, thereby preventing an internal short circuit caused by the shrinkage of the separator and explosion or ignition of the secondary battery. Further, in the secondary battery, since the flame generated during thermal runaway is blocked in a stage in which the electrode assembly is positioned inside the battery cell, a longer flame propagation time may be induced, and thus the safety of the secondary battery and the secondary battery module including the same may be further improved.

Secondary Battery Module

Further, in an embodiment, the present disclosure provides a secondary battery module including the secondary battery described above, and a module case in which the secondary battery is accommodated.

Since the secondary battery module according to an embodiment of the present invention has a configuration including the secondary battery of the present embodiment and has excellent safety when exposed to a high temperature, the secondary battery module according to the present disclosure may be used as a power source for medium-to-large devices that require safety at high temperatures, long cycle characteristics, high rate characteristics, and the like. Specific examples of the medium-to-large devices may include power tools powered by an electric motor, electric vehicles including electric vehicles (EVs), hybrid electric vehicles (HEVs), plug-in hybrid electric vehicles (PHEVs), and the like, electric two-wheeled vehicles including electric bicycles (E-bikes) and electric scooters (Escooter), electric golf carts, power storage systems, and the like, and more specifically, may include HEVs, but the present disclosure is not limited thereto.

[Mode for Implementation of the Invention]

Hereinafter, the present disclosure will be described in more detail with reference to examples and comparative examples.

However, the examples and comparative examples described below are merely intended to illustrate the present disclosure, and the content of the present disclosure is not limited to the examples and comparative examples described below.

Examples 1 to 3 and Comparative Examples 1 to 3

40 positive electrodes and 40 negative electrodes were prepared, and 120 separators (9.5 cm wide×34.5 cm long, and average thickness: about 20 μm) wider than the positive electrodes and the negative electrodes were prepared. Then, a pouch-type secondary battery cell of 10 cm wide×35 cm long×1.6 cm thick in which an electrode assembly for a stack, in which 40 unit cells for a stack of separator-negative electrode-separator-positive electrode-separator were stacked, was embedded were manufactured. In this case, as the separators, a separator made of porous polyethylene was used. Further, a second sealing part was formed by first thermal fusing an outer side of an end part of the negative electrode for the separators positioned on upper and lower surfaces of the negative electrodes at a temperature of 150° C., and as shown in Table 1 below, a first sealing part was formed by injecting Novec 1230 (3M Company) serving as a fire extinguishing agent into the separator in which the second sealing part was formed, and thermal fusing an outer side of the electrode assembly.

Then, as shown in Table 1 below, the manufactured secondary battery cells were disposed with flame propagation prevention parts to manufacture unit cells for a stack:

Position ①: on outer surfaces (inside of the secondary battery cell, the structure of FIG. 5) of 1st and 40th stacked electrode assemblies among stacked electrode assemblies, Position ②: between (inside of the secondary battery cell, the structure of FIG. 6) the outer surfaces of the 1st and 40th stacked electrode assemblies and 19th and 20th stacked electrode assemblies among the stacked electrode assemblies, or Position ③: on upper and lower surfaces of an outside of the battery case (outside of the secondary battery cell).

In the flame propagation prevention part, a mica sheet (average thickness: 0.2 mm) obtained by mixing silicate pulverized powder in which muscovite and lithium muscovite (1 wt./1 wt.) were combined in an amount of 100 parts by weight, and a binder in which polyethylene and polypropylene (1 mol %/mol %) were combined in an amount of 10 parts by weight, processing a mixture to have a sheet shape, and cutting the sheet to the same size as the electrode assembly was used as a flame propagation prevention sheet.

TABLE 1

| | First sealing part included | Second sealing part included | Fire extinguishing agent included | Position of flame propagation prevention part |
|---|---|---|---|---|
| Example 1 | ○ | ○ | — | Position ① |
| Example 2 | ○ | ○ | ○ | Position ① |
| Example 3 | ○ | ○ | ○ | Position ② |
| Comparative Example 1 | — | — | — | Position ① |
| Comparative Example 2 | ○ | — | — | Position ① |
| Comparative Example 3 | ○ | ○ | ○ | Position ③ |

Experimental Example

In order to evaluate the performance of the secondary battery according to the present invention, the following experiments were performed.

A) Evaluation of High-Temperature Shrinkage Percentage of Separator

Each of the secondary battery cells of the examples and comparative examples was left in an oven heated to 150° C. for 20 seconds. Thereafter, a specimen was recovered and disassembled, changes in horizontal and vertical lengths of separators provided in the electrode assembly after being left in the oven were measured as compared to horizontal and vertical lengths (9.5 cm wide×34.5 cm long) before being left in the oven, and an average value thereof was calculated as a shrinkage percentage of the separators. Results of the calculation are shown in Table 2 below.

B) 3-Phase (3P) Full-Wave Test

Three secondary battery cells of each of the examples and comparative examples were prepared, and were charged so that the state of charge (SoC) of each prepared secondary battery cell became 100%. The three prepared secondary battery cells were mounted to be stacked in a 3P propagation test device simulated as a cartridge type module. In this case, the 3P propagation test device was provided to pressurize the secondary battery cells by fastening aluminum plates having a predetermined thickness to the upper and lower parts of the stacked secondary battery cells with bolts assuming a pressurization structure of the secondary battery cells in the module. Further, an aluminum cooling plate was provided between the upper and lower aluminum plates and the secondary battery cell, and between the stacked secondary battery cells. A heating pad (silicon heater manufactured by Hakko Co., Ltd., SBH2012) was installed between the lowest secondary battery cell and the aluminum plate, and the secondary battery cell was heated by heating the heating pad at a temperature increase rate of 7° C./min to induce thermal runaway.

When the heating pad was heated, a time taken from ignition of a first secondary battery cell positioned at a lower end of the device to ignition of a third secondary battery cell through a secondary battery cell was measured. Results of the measurement are shown in Table 2 below.

C) Impact Test

In the same manner as in the 3P full-wave test described above, three secondary battery cells manufactured in the examples and comparative examples were prepared, stacked, and charged with SOC 100%. Then, a secondary battery impact test according to the UN1642DL impact certification standard was performed on the prepared secondary battery cells. In this case, the weight of a weight used was 9 kg, and the experiment was performed by dropping the weight on a round bar with a diameter of 16 mm placed in the secondary battery cell. Results of the experiment are shown in Table 2 below.

TABLE 2

| | Separator percentage shrinkage | 3P full-wave test | | | Impact test | |
|---|---|---|---|---|---|---|
| | | Ignition time to 1$^{st}$ cell | Ignition time to 2$^{nd}$ cell | Ignition time to 3$^{rd}$ cell | Round bar average pressing width (mm) | Ignition |
| Example 1 | <3% | 36 seconds | 115 seconds | 192 seconds | 7.6 | X |
| Example 2 | <3% | 39 seconds | 129 seconds | 207 seconds | 7.6 | X |
| Example 3 | <3% | 44 seconds | 149 seconds | 213 seconds | 6.9 | X |
| Comparative Example 1 | >10% | 27 seconds | 76 seconds | 114 seconds | 8.4 | X |
| Comparative Example 2 | 5 to 9% | 29 seconds | 88 seconds | 131 seconds | 8.1 | X |
| Comparative Example 3 | <3% | 31 seconds | 99 seconds | 148 seconds | 14.1 | ○ |

As shown in Table 2, it can be seen that the secondary battery according to embodiments of the present invention has excellent safety at a high temperature.

Specifically, in the secondary batteries of the examples, it was found that the separator shrinkage percentage at a high temperature was less than 5%, and it was confirmed that it took 190 seconds or more for all three cells to ignite during the 3P full-wave test. Further, it was found that the secondary batteries of the examples had an average pressing width of less than 8 mm during the impact test and did not cause ignition.

From these results, the secondary battery according to exemplary embodiments of the present invention includes an electrode assembly having a structure in which a separator is individually sealed for a positive electrode and a negative electrode, and includes a flame propagation prevention part on an outer surface of the electrode assembly, and thus it is possible to significantly suppress flame propagation to adjacent battery cells, and it is possible to safely protect the battery cells from external impact by the flame propagation prevention part without a need to thicken the battery case itself even when it is used as a single battery cell. Therefore, it can be seen that overall battery cell safety is significantly improved.

While exemplary embodiments of the present invention and their advantages have been described above in detail, it should be understood by those skilled in the art that various changes, substitutions and alterations may be made herein without departing from the scope of the invention as defined by the following claims.

Therefore, the technical scope of the present invention should not be limited to the content described in the detailed description of the specification, but should be defined by the appended claims.

REFERENCE NUMERALS

1: SECONDARY BATTERY MODULE
10 AND 100: SECONDARY BATTERY
11: MODULE CASE

20: FLAME PROPAGATION PREVENTION MEMBER
110: ELECTRODE ASSEMBLY
111: POSITIVE ELECTRODE
112: NEGATIVE ELECTRODE
113: SEPARATOR
114: FIRST SEALING PART
115: SECOND SEALING PART
116: ADHESIVE MEANS
117: FIRE EXTINGUISHING AGENT
118: ACCOMMODATION PART
120: FLAME PROPAGATION PREVENTION PART
121: FLAME PROPAGATION PREVENTION SHEET
130: BATTERY CASE
140: ELECTRODE LEAD
T: ELECTRODE TAB
X: UPPER PART OF ELECTRODE ASSEMBLY
Y: LOWER PART OF ELECTRODE ASSEMBLY
M: UNIT CELL OR MONO CELL
H1: HALF CELL
A: QUADRANGULAR PROTRUSION
B: STRIPE-SHAPED PROTRUSION
A: PROTRUSION
B: CONCAVE PART

The invention claimed is:

1. A secondary battery comprising:

an electrode assembly having a stacked structure, the electrode assembly including a plurality of positive electrodes, a plurality of negative electrodes, and a plurality of separators, the plurality of separators being disposed between opposing surfaces of the plurality of negative electrodes and the plurality of positive electrodes, wherein the plurality of separators are additionally positioned along opposing outermost surfaces of the stacked structure of the electrode assembly; and a battery case, the battery case being accommodating the electrode assembly therein, wherein the plurality of separators include a first sealing part and a second sealing part, the first sealing part individually bonding a first end part of each of the plurality of separators together, the first sealing part being disposed in a first exterior region of the electrode assembly, the first exterior region being positioned at an outermost extremity of the plurality of separators, and the second sealing part individually bonding a second end part of each of the plurality of separators together, the second sealing part being disposed in a second exterior region of the electrode assembly, the second exterior region being positioned between a center of the electrode assembly and the first exterior region of the electrode assembly, wherein the second sealing part and the first sealing part define an accommodation part therebetween, the accommodation part being spaced apart laterally from the plurality of negative electrodes.

2. The secondary battery of claim 1, wherein the accommodation part includes a fire extinguishing agent, the firing extinguishing agent being configured to phase shift to a gas phase in a range of 100° C. to 300° C.

3. The secondary battery of claim 2, wherein the fire extinguishing agent includes one or more of halogenated carbon, a halogenated ketone, a halogenated alkane, or an inert gas.

4. The secondary battery of claim 1, wherein the first sealing part is formed by adhesion or thermal fusing of the first end parts of the plurality of separators together, and the second sealing part is formed by adhesion or thermal fusing of the second end part of the plurality of separators together.

5. The secondary battery of claim 1, wherein an average thickness of the plurality of separators ranges from 5 μm to 50 μm.

6. The secondary battery of claim 1, wherein the electrode assembly includes a flame propagation prevention part disposed on a first outer surface of the electrode assembly, wherein the first outer surface lacks a tab.

7. The secondary battery of claim 1, wherein the electrode assembly includes a plurality of unit cells, the plurality of cells being stacked upon each other in a stacking dimension, and a flame propagation prevention part, the flame propagation prevention part is positioned between the plurality of unit cells in the stacking dimension.

8. The secondary battery of claim 6, wherein the flame propagation prevention part includes a flame propagation prevention sheet comprising a silicate sheet made of a silicate containing one or more elements of silicon (Si), aluminum (Al), iron (Fe), magnesium (Mg), manganese (Mn), titanium (Ti), sodium (Na), potassium (K), fluorine (F), or oxygen (O).

9. The secondary battery of claim 6, wherein the flame propagation prevention part includes a flame propagation prevention sheet that includes one or more of muscovite, fenzite, celonite, paragonite, margarite, phlogopite, biotite, anite, ferrous mica, siderophilite, clintonite, lithium muscovite, trillithionite, polylithionite, zinnwaldite, or taniolite.

10. The secondary battery of claim 8, wherein the silicate sheet contains a binder in an amount of 1 to 20 parts by weight with respect to 100 parts by weight of a total amount of a silicate, and the binder includes one or more of polyethylene (PE), polypropylene (PP), or a polyolefin, the polyolefin including a copolymer of PE and PP, a polyamide including nylon, or heat-resistant silicone.

11. The secondary battery of claim 6, wherein the flame propagation prevention part includes a flame propagation prevention sheet that includes a protrusion, a concave part, or a predetermined pattern of repeating protrusions and concave parts on a first surface of the flame propagation prevention sheet.

12. A secondary battery module comprising:

the secondary battery according to claim 1; and a module case, the module case accommodating the secondary battery therein.

13. The secondary battery of claim 7, wherein the flame propagation prevention part includes a flame propagation prevention sheet comprising a silicate sheet made of a silicate containing one or more elements of silicon (Si), aluminum (Al), iron (Fe), magnesium (Mg), manganese (Mn), titanium (Ti), sodium (Na), potassium (K), fluorine (F), or oxygen (O).

14. The secondary battery of claim 7, wherein the flame propagation prevention part includes a flame propagation prevention sheet that includes one or more of muscovite, fenzite, celonite, paragonite, margarite, phlogopite, biotite, anite, ferrous mica, siderophilite, clintonite, lithium muscovite, trillithionite, polylithionite, zinnwaldite, or taniolite.

* * * * *